United States Patent [19]

Winbow et al.

[11] Patent Number: 4,649,526
[45] Date of Patent: Mar. 10, 1987

[54] METHOD AND APPARATUS FOR MULTIPOLE ACOUSTIC WAVE BOREHOLE LOGGING

[75] Inventors: Graham A. Winbow; Lawrence J. Baker, both of Houston, Tex.

[73] Assignee: Exxon Production Research Co., Houston, Tex.

[21] Appl. No.: 525,910

[22] Filed: Aug. 24, 1983

[51] Int. Cl.$^4$ .............................................. G01V 1/40
[52] U.S. Cl. ........................................ 367/35; 367/27
[58] Field of Search ........................ 367/25, 31, 35, 38, 367/86, 911, 27; 181/102, 104, 105

[56] References Cited

U.S. PATENT DOCUMENTS

| | | | |
|---|---|---|---|
| 3,237,153 | 2/1966 | Blizard | 340/861 |
| 3,312,934 | 4/1967 | Stripling et al. | 340/18 |
| 3,325,780 | 6/1967 | Horan | 367/157 |
| 3,593,255 | 7/1971 | White | 367/25 |
| 4,312,052 | 1/1982 | Vogel et al. | 181/104 |

FOREIGN PATENT DOCUMENTS

| | | | |
|---|---|---|---|
| 031989 | 7/1981 | European.Pat. Off. | |
| 83/0024 | 4/1983 | Nambia | 367/25 |
| 83/0043 | 7/1983 | Nambia | 367/25 |
| 1193382 | 5/1970 | United Kingdom | |
| 1193383 | 5/1970 | United Kingdom | |
| 1193381 | 5/1970 | United Kingdom | |
| 1582714 | 1/1981 | United Kingdom | |

OTHER PUBLICATIONS

Aron, J. et al, "Formation Compressional and Shear Interval-Transit-Time Logging by Means of Long Spacings and Digital Techniques", 10-3-78.
J. E. White, "The Hula Log: A Proposed Acoustic Tool," Presented at the 8th SPWLA Conference, Denver (1967).
Winbow, "How to Separate Compressional and Shear Arrivals in a Sonic Log," presented and distributed to Attendees of the 50th Annual International Meeting of the Society of Exploration Geophysicists, Houston, Tex., Nov. 17-20, 1980.

Primary Examiner—Thomas H. Tarcza
Assistant Examiner—Daniel T. Pihulic
Attorney, Agent, or Firm—Alfred A. Equitz

[57] ABSTRACT

The inventive multipole acoustic wave logging method includes the steps of introducing a $2^n$-pole acoustic wave into a virgin earth formation surrounding a borehole but separated from the borehole by an invaded zone, where n is an integer greater than zero, and detecting the refracted arrival of the $2^n$-pole acoustic wave. The inventive apparatus includes means, separated from the borehole wall during operation, for generating a $2^n$-pole acoustic wave that will propagate through the borehole fluid and thereafter into the virgin earth formation. If the $2^n$-pole acoustic wave is a compressional wave, the compressional wave velocity of the virgin formation is determined from repeated measurements, at successively increased longitudinal spacings between the points of generation and detection of the $2^n$-pole wave, of the time interval between detections of the refracted arrival of the $2^n$-pole acoustic wave by the two detectors. If the $2^n$-pole acoustic wave is a shear wave, the shear wave velocity of the virgin formation is similarly determined. The radius of the invaded zone may be determined from the compressional wave velocity in the virgin formation and in the invaded zone or from the shear wave velocity in the virgin formation and in the invaded zone.

21 Claims, 12 Drawing Figures

METHOD AND APPARATUS FOR MULTIPOLE ACOUSTIC WAVE BOREHOLE LOGGING

CROSS REFERENCES TO RELATED APPLICATIONS

U.S. patent applications Ser. No. 379,684 by Winbow et al., filed May 19, 1982, Ser. No. 395,449 by Winbow et al., filed July 6, 1982, Ser. No. 440,140 by Winbow et al., filed Nov. 8, 1982, and Ser. No. 454,925 by Winbow et al., filed Jan. 3, 1983, all assigned to Exxon Production Research Company, relate to the general field of this invention.

BACKGROUND OF THE INVENTION

This invention relates to acoustic well logging in general and more particularly to acoustic compressional wave well logging and acoustic shear wave well logging.

Acoustic well logging has been generally accepted as a method for obtaining information about subterranean formations surrounding wells or boreholes. The applications of acoustic well logging include the determination of formation lithology, density, and porosity, the conversion of seismic time sections to depth sections, the determination of elastic constants of subsurface materials, and the detection of fractures and provision of information about their orientation.

In acoustic well logging it is customary to measure the compressional wave or shear wave velocity of subterranean formations surrounding boreholes. Compressional waves are also known as P-waves. Shear waves are also known as S-waves. A conventional P-wave velocity logging system includes a cylindrical logging sonde suitable for suspension in a borehole liquid, a source connected to the sonde for generating P-waves in the borehole liquid and two detectors connected to the sonde and spaced apart from the P-wave source for detecting P-waves in the borehole liquid. A compressional wave in the borehole liquid generated by the source is refracted in the earth formation (the phrase "earth formation" will be used throughout this specification to denote any subterranean formation, and will not be used in a narrow sense to denote any particular type of subterranean formation) surrounding the borehole. It propagates through a portion of the formation and is refracted back into the borehole liquid and detected by two detectors spaced vertically apart from each other and from the P-wave source. The ratio of the distance between the two detectors to the time between the detections of the P-wave by the two detectors yields the P-wave velocity of the formation. The P-waves in the borehole liquid caused by refraction of P-waves back into the borehole may be called the P-wave arrival.

The compressional wave velocity of the earth formation surrounding a borehole frequently varies with radial distance from the borehole. Several factors can give rise to such an effect, including drilling damage to the formation, penetration of the formation adjacent to the borehole by borehole drilling fluids, and in the Arctic, melting of permafrost near the borehole.

The part of the formation that has been so damaged, penetrated, or melted is known as the invaded zone, and the remaining part of the formation which has not been so affected, the virgin formation. Thus, the borehole is surrounded by the invaded zone which in turn is surrounded by the virgin formation. The compressional wave velocity of the virgin formation is usually different from that of the invaded zone. It is well known that compressional wave velocity logging of the virgin formation will yield information helpful for determining the porosity, rock lithology and density of the virgin earth formation.

The conventional P-wave logging source is symmetrical about the logging sonde axis. The P-waves generated by a conventional symmetrical source do not penetrate deeply into the earth formation surrounding the borehole. The depth of penetration of the P-wave arrival depends on the distance or spacing between the P-wave source and the detectors: the greater the source-detector spacing, a greater part of the P-wave energy refracted back into the borehole and detected will have penetrated deeper. With the spacing of six to ten feet commonly used in conventional P-wave logging, most of the energy of the P-waves generated by the source and detected by the detectors frequently does not penetrate beyond the invaded zone and only a small part of the P-wave energy reaches the virgin formation. The P-waves that reach and travel in the virgin formation typically will have smaller amplitudes than will the P-waves that do not penetrate beyond the invaded zone so that their arrivals may be masked by the arrivals of the P-waves that do not penetrate beyond the invaded zone. Therefore, where the source-detector spacing does not exceed the conventional spacing of six to ten feet, it may not be possible to use a symmetrical conventional source to log the P-wave velocity of the virgin formation. The source-detector spacing may be increased to increase the penetration of the P-waves. Increasing the source-detector spacing will, however, reduce the signal strength of the P-wave arrival. The attenuation of the P-waves traveling in the formation increases with the distance they travel in the formation. Thus, if the source-detector spacing is increased, the P-wave arrivals detected will be weaker and the resulting P-wave log may have a poor signal-to-noise ratio. It is thus desirable to increase the penetration of the P-waves without increasing the source-to-detector spacing.

Asymmetric compressional wave sources have been developed for logging the shear wave velocity of an earth formation. In such asymmetric sources, the source generates in the borehole fluid a positive pressure wave in one direction and a simultaneous negative pressure wave in the opposite direction. The interference of the two pressure waves produces a shear wave which is refracted in the earth formation. This type of asymmetric source is disclosed by European patent application Ser. No. 31989 by Angona et al., U.S. Pat. No. 3,593,255 to White, issued July 13, 1971, and U.S. Pat. No. 4,207,961 to Kitsunezaki, issued June 17, 1980.

Angona et al. discloses a bender-type source which comprises two circular piezoelectric plates bonded together and attached to a logging sonde by their perimeters. When voltage is applied across the two piezoelectric plates, the center portion of the circular plates will vibrate to create a positive compressional wave in one direction and a simultaneous negative compressional wave in the opposite direction. The two compressional waves will interfere to produce a shear wave in the earth surrounding the borehole. The bender-type source disclosed by Angona et al., will have a limited frequency range. It is specified in Angona et al., that the apparatus disclosed therein is capable of generating an acoustic signal having frequency components in the range of about 1 to 6 kHz, a frequency range in which the amplitude of the shear waves generated and refracted in the formation will likely be significantly greater than that of the P-waves generated and refracted in the formation, and thus a frequency range too low for compressional wave logging in most formations.

White discloses an asymmetric source comprising two piezoelectric segments each in the shape of a half hollow cylinder. The two segments are assembled to form a split cylinder. The two segments have opposite polarization and electrical voltage is applied to each segment, causing one segment to expand radially and simultaneously causing the other segment to contract radially, thereby producing a positive compressional wave in one direction and a simultaneous negative compressional wave in the opposite direction. The two compressional waves will interfere to produce a shear wave in the earth formation adjacent to the borehole. Such shear wave propagates along the borehole and is detected by a pair of transducers positioned substantially directly above or beneath the piezoelectric segments of the source. The White apparatus "accentuates" the shear waves and virtually eliminates the faster-traveling compressional waves generated and detected thereby. White does not disclose or suggest apparatus generally suitable for compressional wave logging. Nor does White disclose or suggest any method suitable for acoustic velocity logging of the virgin formation surrounding a borehole.

In Kitsunezaki, coils mounted on a bobbin assembly are placed in the magnetic field of a permanent magnet and current is passed through the coils to drive the bobbin assembly. The movement of the bobbin assembly ejects a volume of water in one direction and simultaneously sucks in an equivalent volume of water in the opposite direction, thereby generating a positive compressional wave in one direction and a simultaneous negative compressional wave in the opposite direction. Kitsunezaki's asymmetric source, however, cannot be driven at high frequencies or with sufficient power required for compressional wave logging in most formations. Also it cannot operate at great depths or under great pressures.

In another type of asymmetric shear wave logging source, instead of coupling the source to the borehole wall through the medium of the borehole fluid, the source is either coupled directly to the borehole wall or through mechanical means such as mounting pads. Such shear wave logging sources are disclosed in U.S. Pat. No. 3,354,983 to Erickson et al., issued Nov. 28, 1967, and U.S. Pat. No. 3,949,352 to Vogel, issued April 6, 1976.

SUMMARY OF THE INVENTION

The method and apparatus of this invention are for logging the compressional wave velocity, or the shear wave velocity, of the virgin earth formation surrounding a borehole but separated from the borehole by an invaded zone and for logging the radius of such invaded zone. The apparatus of this invention comprises a housing adapted to be raised and lowered into a borehole, signal generating means in the housing for transmitting a $2^n$-pole acoustic wave (the multipole nomenclature used throughout this specification is explained below in the first paragraph of the Description of the Preferred Embodiment) through the virgin earth formation surrounding a borehole, where n is an integer greater than zero, and signal detecting means connected to the housing longitudinally spaced a sufficient distance along the borehole from the signal generating means for detecting the arrival of such $2^n$-pole acoustic wave.

The compressional wave logging method of the invention comprises transmitting a $2^n$-pole compressional wave through the virgin earth formation surrounding a borehole, where n is an integer greater than zero, and detecting the $2^n$-pole compressional wave arrival at at least one point longitudinally spaced along the borehole from the point of transmission. If the compressional wave arrival is detected at two points, the time lapse between the detections at the two points is measured to determine the compressional velocity of the virgin formation surrounding the borehole. If the $2^n$-pole wave arrival is detected at only one point, the time lapse between transmission and detection is measured to determine the compressional wave velocity of the virgin formation. The latter method is more difficult to perform and much less accurate. In either case, the compressional wave velocity of the earth formation preferably is measured repeatedly with successively increasing source-detector spacings, until the compressional wave velocities measured in two consecutive measurements are substantially the same. That substantially constant measured velocity will be the compressional wave velocity of the virgin formation. Where the compressional wave velocities of the invaded zone and virgin formation are known, the minimum source-detector spacing which results in such substantially constant measured velocity may be used to determine the radius of the invaded zone.

The shear wave logging method of the invention is identical to the compressional wave velocity logging method except that $2^n$-pole shear waves (rather than $2^n$-pole compressional waves) are transmitted through the virgin earth formation and detected to determine the shear wave velocity of the virgin formation.

DESCRIPTION OF THE PREFERRED EMBODIMENT

The multipole nomenclature is based upon consecutive powers of two, that is, $2^n$, n being an integer and n=1, 2, 3 and on indefinitely. Thus, the multipoles include the dipole (n=1), the quadrupole (n=2) and the octopole (n=3). The nomenclature for higher order multipoles is based upon $2^n$ with n=4, 5, 6 and so on indefinitely. The multipoles do not include the monopole (n=0).

Figures 1, 2:
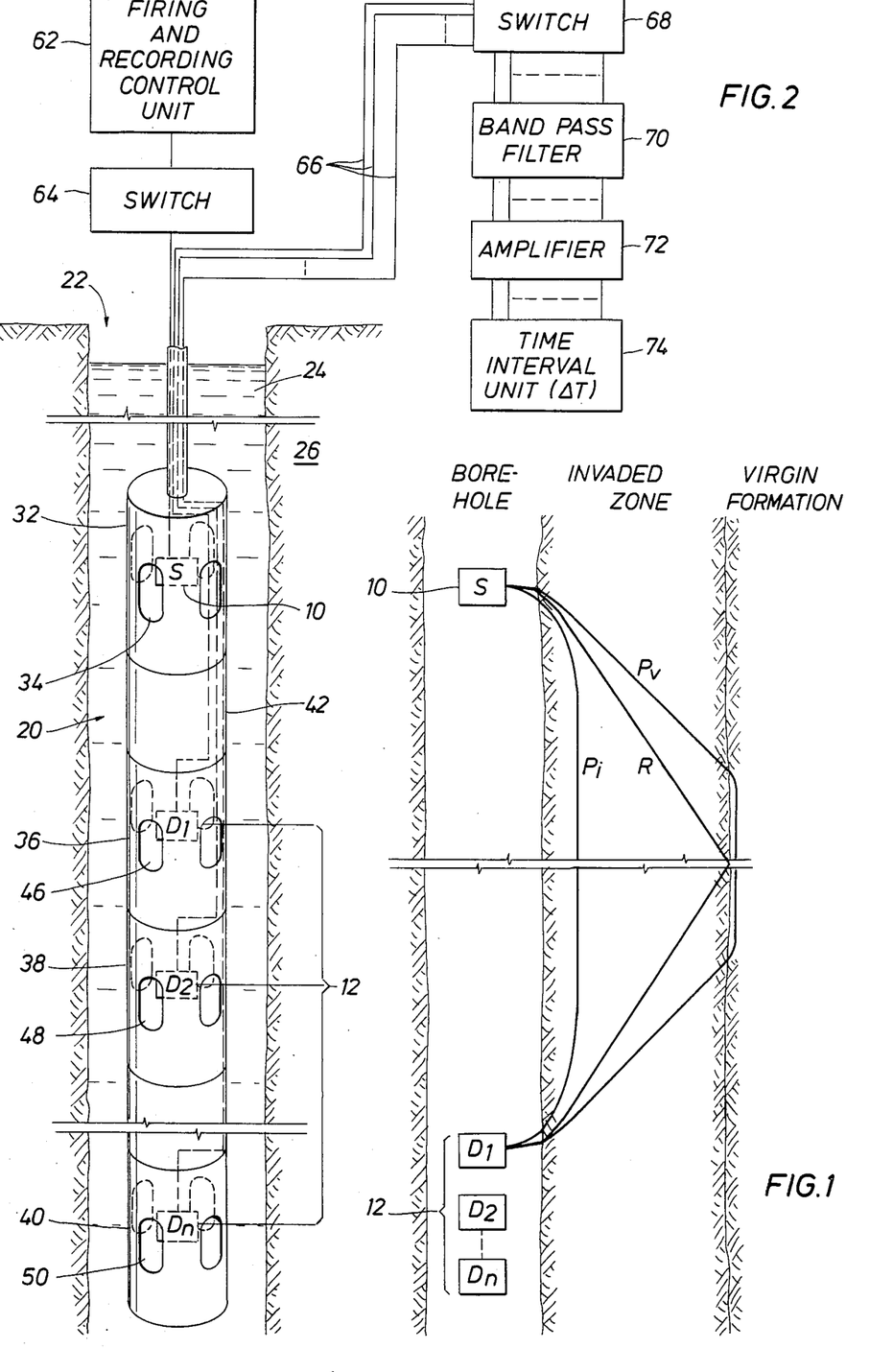
FIG. 1 illustrates three ray paths of acoustic waves generated by a multipole source. One ray path indicates an acoustic wave propagating in the invaded zone of the earth formation surrounding a borehole, another ray path indicates an acoustic wave propagating through and refracted by the virgin formation surrounding the invaded zone, and the third ray path indicates an acoustic wave reflected from the invaded zone-virgin formation interface.
FIG. 2 is a simplified, partially schematic and partially perspective view of a quadrupole compressional wave logging device illustrating the preferred embodiment of this invention.

FIG. 1 illustrates three ray paths of acoustic waves generated by an an acoustic source 10 and one of the detectors D1 of a detector array 12. The acoustic wave velocities of the invaded zone may increase continuously with increasing distance from the borehole because of the different degrees of penetration of the borehole liquid into the invaded zone or damage near the borehole. The ray paths of the acoustic waves in the invaded zone will be curved, substantially as shown in FIG. 1, when the acoustic wave velocity of the invaded zone so depends on the distance from the borehole. For simplicity, FIG. 1 will be discussed below under the assumption that the acoustic waves are P-waves. It should be understood that such discussion is equally applicable in the case where the acoustic waves are S-waves.

In addition to traveling along the indicated ray paths, P-waves generated by source 10 also travel in the regions on both sides of each ray path: the region closer to the borehole and the region farther into the invaded zone. Those P-waves traveling in the invaded zone may be called Pi and those travelling in the virgin formation Pv. In addition to the refracted arrivals Pi and Pv, there is shown another early arrival, R, resulting from the reflection at the invaded zone-virgin formation interface. However, it is always the case that either Pi or Pv (or both) arrive at detector D1 before R. For a monopole P-wave much of the energy detected by array 12 does not penetrate beyond the invaded zone so that Pv may be small or at best comparable in amplitude compared to Pi. Therefore, it will be difficult to distinguish the Pv arrival detected from the Pi arrival detected so as to determine the P-wave velocity in the virgin formation.

The applicants have discovered that, when generated with the same source-detector spacing, the peak energy of a dipole P-wave penetrates the earth deeper than that of a monopole P-wave, and the peak energy of a quadrupole P-wave penetrates deeper than that of a dipole P-wave. In other words, as compared to the monopole P-wave, a greater percentage of the energy of the dipole P-wave will travel in the virgin formation. For the quadrupole P-wave, an even higher percentage of the energy travels in the virgin formation so that Pv has intensity significantly greater than Pi and the P-wave velocity of the virgin formation may be logged by logging Pv.

The applicants have also discovered that for the same source-detector spacing, the percentage of energy traveling in the virgin formation will increase with the order of the multipole P-wave source. Thus a higher order P-wave source will have a better Pv to Pi ratio. However, the 16-pole and other higher order multipole P-wave sources will generally generate P-waves weaker than those generated by the quadrupole and octopole P-wave sources. Therefore, the quadrupole and octopole P-wave sources are the preferred P-wave sources for logging the virgin formation.

FIG. 2 is a partially schematic and partially perspective view of an acoustic logging system illustrating the preferred embodiment of the apparatus of this invention. A logging sonde 20 is adapted to be lowered into or removed from a borehole 22. To initiate logging, sonde 20 is suspended into a liquid 24 contained in borehole 22 which is surrounded by an earth formation 26 comprising an invaded zone immediately adjacent to liquid 24 and a virgin formation surrounding the invaded zone (the invaded zone and virgin formation of earth formation 26 are not shown in FIG. 2). For ease of assembly, operation and repairs, logging, sonde 20 comprises a number of hollow cylindrical sections. The top section 32 contains a quadrupole P-wave logging source 10 and contains windows 34 which allow the P-waves generated by source 10 to propagate readily therethrough into the borehole liquid. Although four windows 34 are shown, section 32 may have more or less than four of such windows. Sections 36 and 38 contain, respectively, the first two detectors D1 and D2 of the detector array 12 and section 40 contains the last detector Dn of array 12. Other sections containing the remainder of the array are not shown or are only partly shown in FIG. 2.

Section 42 is a spacer section separating section 32 and section 36. The source-detector spacing may be adjusted by using such a spacer section of the appropriate length or by using more or fewer spacers to separate the source and the detectors. Alternatively, the effective source-detector spacing may be increased by providing an array of detectors, such as array 12 of FIG. 2, and selectively recording the arrivals detected by individual detectors or pairs of detectors positioned at increasing distances from the source.

Each section which contains a detector of array 12 has windows (such as windows 46, 48 and 50 of FIG. 2) through which the refracted P-waves from earth formation 26 may reach array 12.

Source 10 is connected to a firing and recording control unit 62 through a switch 64. The P-waves detected by array 12 are fed via a cable containing wires 66 to a switch 68, a band pass filter 70, an amplifier 72 and a time interval unit 74.

In a manner explained below the firing and recording control unit 62 is used to fire source 10 which produces a quadrupole P-wave in formation 26. The quadrupole P-wave arrival is detected by detectors D1 through Dn of detector array 12, which transform the acoustic signals recorded into electrical signals. The signals are fed to filter 70 through switch 68 whose function will be described below. The electrical signals are filtered by filter 70 and amplified by amplifier 72. The time interval between the detections by adjacent detectors may then be stored or displayed as desired in unit 74.

Figure 12:
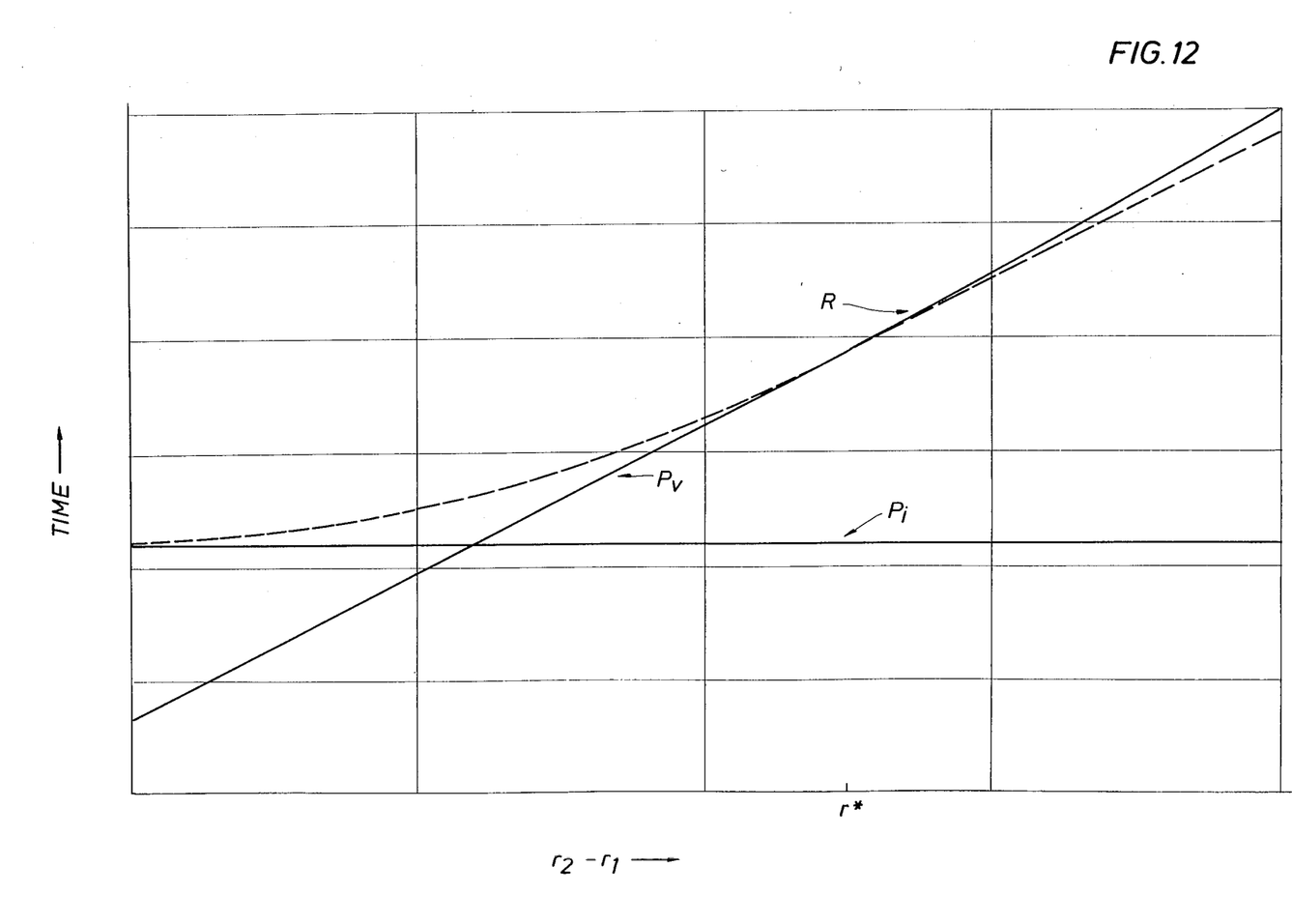
FIG. 12 is a graph schematically illustrating the variation in the expected arrival times, respectively, of the refracted arrival $P_v$ from the virgin formation, the refracted arrival $P_i$ from the invaded zone, and the reflected arrival R from the invaded zone-virgin formation interface, as the thickness of the invaded zone increases.

When a given dipole P-wave or a higher order P-wave is transmitted into a formation the arrival times of the refracted P-wave signals at the detectors will vary with the thickness of the invaded zone. FIG. 12 illustrates schematically the variation of the expected arrival times of the refracted arrivals, Pv and Pi, and the reflected arrival R as the thickness of the invaded zone increases. The thickness of the invaded zone is equal to the difference between $r_2$, the outer radius of the invaded zone, and $r_1$, the radius of the borehole. The hyperbolic curve representing the arrival times of reflected arrival R is tangent to the straight line curve representing the arrival times of Pv when the thickness of the invaded zone is equal to a critical thickness $$r^* = (z/2)(((Cv/Ci) - 1)((Cv/Ci) + 1))^{\frac{1}{2}},$$

where z is the source-detector spacing, Cv is the P-wave velocity in the virgin formation, and Ci is the P-wave velocity in the invaded zone. The applicants have found that for a considerable range of invaded zone thickness values near $r^*$, refracted arrival Pv and reflected arrival R arrive at times differing by less than 1%, so that R will effectively reinforce the detected amplitude of Pv. The maximum amplitude of reflected arrival R occurs when the thickness of the invaded zone is equal to $r^*$. Only when the thickness of the invaded zone is significantly greater than $r^*$ is the amplitude of reflected arrival R sufficiently diminished so that Pi is the first significant arrival.

Figure 11:
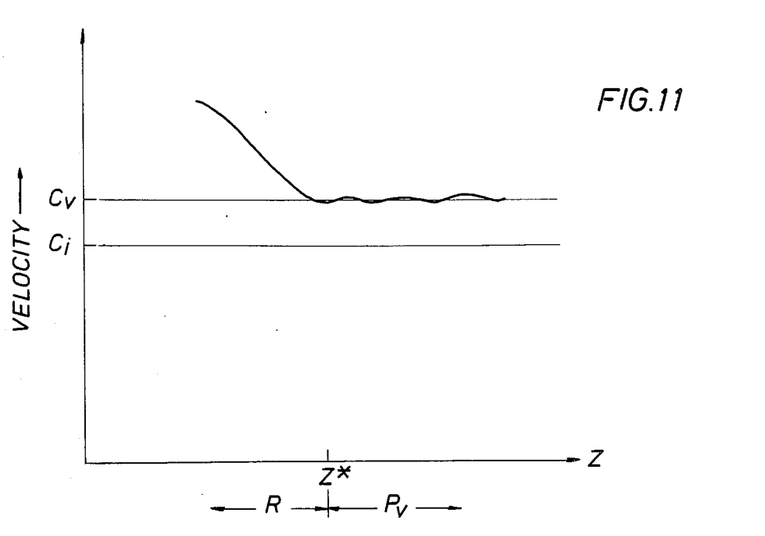
FIG. 11 is a graph schematically illustrating the variation of the compressional wave velocity measured by the apparatus of the invention as the source-detector spacing increases.

Increasing the source-detector spacing will increase the depth of penetration of the P-wave energy into the invaded zone. If it is uncertain whether the arrival detected is that of Pi or Pv, the preferred method for distinguishing between the Pi and Pv arrivals involves plotting the velocity of the arrival against the source-detector spacing z as shown in FIG. 11. At small source-detector spacings the velocity logged will depend on the source-detector spacing z, for reasons to be discussed below. When the source-detector spacing reaches a certain critical spacing $z^*$, the velocity logged approaches a constant. This constant velocity is substantially equal to Cv, the P-wave velocity in the virgin formation. The critical spacing, $z^*$, is the spacing at which the dominant portion of the P-wave energy reaches the invaded zone-virgin formation interface.

The critical spacing, $z^*$, may be determined by plotting the P-wave velocity measured against the source-detector spacing z, as in FIG. 11. The P-wave velocity to be plotted is calculated by dividing the distance between two detectors by the time interval between the detections of the P-wave arrival by the two detectors. If the source-detector spacing is sufficiently small so that the P-wave never penetrates to the virgin formation, the entire ray path between the source and the detector is curved and the difference between the two ray path lengths is less than the distance between the two detectors. Thus, where the P-wave ray path never reaches the virgin formation, the P-wave velocity calculated in accordance with the above approximation tends to overestimate the actual P-wave velocity. When the source-detector spacing is increased sufficiently for the P-wave ray path to reach the virgin formation, the P-wave velocity measured will be a good approximation of the P-wave velocity in the virgin formation. Such minimum source-detector spacing is the critical spacing, $z^*$. When the source-detector spacing is increased to beyond the critical spacing, the P-wave velocity measured will be substantially constant, thus determining the point in FIG. 11 beyond which the P-wave velocity measured is substantially constant.

The apparatus of FIG. 2 may also be used to determine the depth of invasion, D, surrounding the borehole by exploiting the following relationship:

$$d = (z/2)(((Cv/Ci) - 1)((Cv/Ci) + 1))^{\frac{1}{2}}$$

where z is the source-detector spacing; d is the penetration depth of a P-wave into the formation; Cv is the P-wave velocity in the virgin formation; and Ci is the P-wave velocity in the invaded zone. The depth of penetration of the P-wave is equal to D, the depth of invasion, when the P-wave penetrates the invaded zone to reach the interface between the invaded zone and the virgin formation. Thus, if the critical spacing $z^*$ and P-wave velocities in the invaded zone and the virgin formation are known, the depth of invasion D may be calculated from the formula above.

The above discussion regarding P-wave velocity logging and the propagation of P-waves in the invaded zone and virgin earth formation surrounding a borehole applies equally to S-wave velocity logging and the propagation of S-waves. The methods disclosed herein are thus applicable in the context of S-wave velocity logging as well as in the context of P-wave velocity logging.

The seismic energy radiated by the logging sonde apparatus disclosed herein may be divided into two categories: Es, the energy radiated in the form of shear waves and Ep, the energy radiated in the form of compressional waves. The ratio of Ep to Es will depend on the frequency spectrum of the seismic radiation generated by the apparatus. The apparatus disclosed herein thus may be suitable for S-wave velocity logging as well as for P-wave velocity logging. For efficient compressional wave logging, it is desirable that the frequency range of generated radiation be that which maximizes the ratio of Ep to Es. This preferred frequency range will depend on the velocity of compressional waves in the earth formation to be logged. The applicants have found that for P-wave logging, where the compressional wave velocity in the formation is (a) thousand feet per second, the frequency range of radiation generated by the apparatus of this invention will desirably contain the frequency (a)(10/d)kHz, where d is the diameter of the borehole in inches.

Operation of the multipole seismic source of the present invention at frequencies significantly lower than (a)(10/d) kHz will result in the generation of a relatively strong shear wave signal and a relatively weak compressional wave signal. The applicants have discovered that the apparatus of the present invention may desirably be operated in such low frequency range for efficient S-wave velocity logging. Operation in such low frequency range will enable the relatively strong shear wave signal to penetrate far into the formation away from the borehole. With sufficiently large source-detector spacing, the shear wave velocity of the virgin formation may thus be logged.

The preferred method for logging the P-wave velocity of a virgin formation using the apparatus disclosed herein involves generating a broad band signal which is refracted through the virgin formation, detected by detectors D1 through Dn and fed through band pass filter 70. For P-wave logging, band pass filter 70 is chosen to filter the detected signal so that the recorded P-wave Pv arrivals have large amplitude relative to the recorded shear wave arrivals. For S-wave logging, band pass filter 70 is chosen to filter the detected signal so that the recorded shear wave arrivals have large amplitude relative to the recorded P-wave arrivals.

Figure 3:
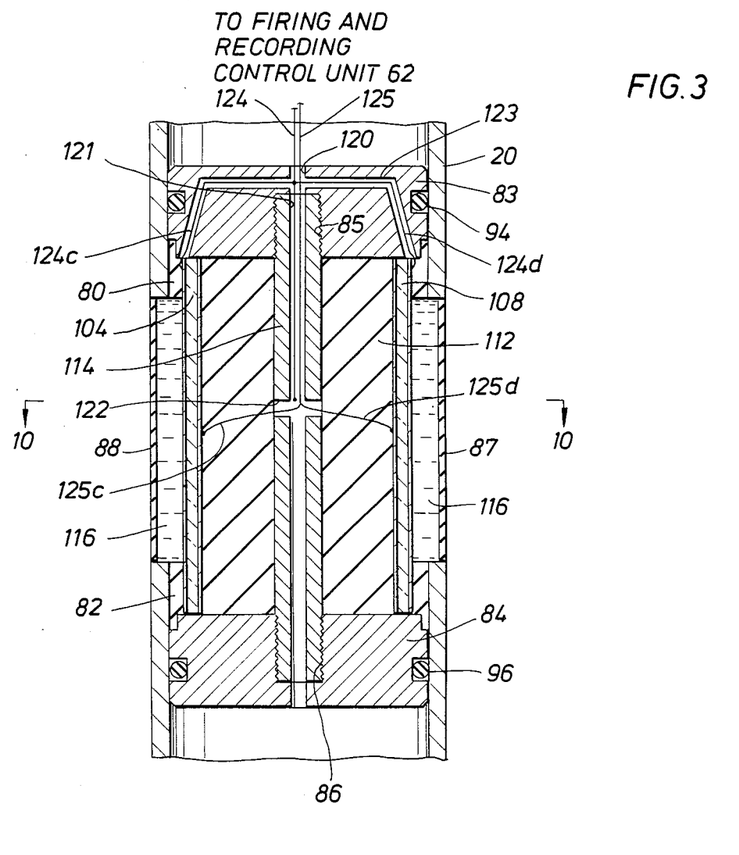
FIG. 3 is a cross-sectional view of the preferred embodiment of the quadrupole compressional wave source illustrated in simplified form by FIG. 2, taken on a plane containing the logging sonde axis.
Figure 10:
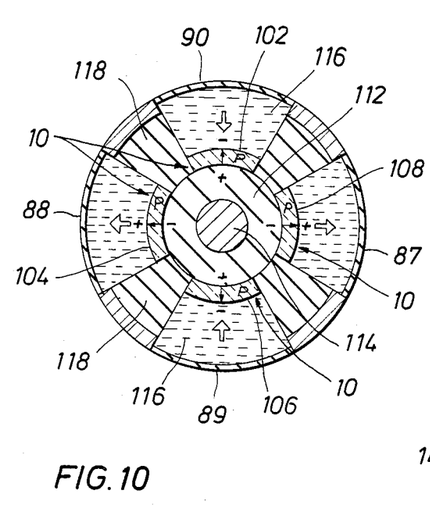
FIG. 10 is a cross-sectional view of the quadrupole compressional wave logging source of FIG. 3, taken along line 10—10.

FIGS. 3 and 10 illustrate in more detail the preferred embodiment of the apparatus of this invention. FIG. 3 is a cross-sectional view of the preferred embodiment of the quadrupole compressional wave logging source illustrated in simplified form by FIG. 2, taken on a plane containing the logging sonde axis. FIG. 10 is a view taken along line 10—10 of FIG. 3 showing a cross-section of the quadrupole source on a plane perpendicular to the axis of the logging sonde.

Source 10 of FIG. 10 comprises four substantially similar sectors (or "members") 102, 104, 106, 108 of a radially polarized piezoelectric hollow cylinder arranged substantially coaxial with and equidistant from the sonde axis. Sectors of different cylinders with different radii may also be used. It will be appreciated that such four sectors may be used even if they are not coaxial with the sonde axis provided that their axes are substantially parallel to the sonde axis and that they are so oriented that the sonde axis is on the concave side of each sector. Such a configuration may be achieved by moving the four sectors 102, 104, 106, 108 of FIG. 10 radially away from the sonde axis by different distances. The cyclic order 102, 104, 106, 108 of the four sectors in FIG. 10 defines the relative positions of the four sectors. Since the order is cyclic, any one of the following cyclic orders may also be used to arrive at the same relative positions: 104, 106, 108, 102; 106, 108, 102, 104; and 108, 102, 104, 106. While the four sectors are preferably substantially evenly spaced around the sonde axis as shown in FIG. 10, it will be understood that configurations in which the four sectors are not evenly spaced around the sonde axis may also be used and are within the scope of this invention. Interchanging two sectors oppositely situated, such as 102 with 106 or 104 with 108, also will not affect the operation of the source of FIG. 10.

Source 10 need not comprise four sectors of a hollow cylinder as shown in FIG. 10 but may comprise members of any shape or size so long as their centroids are located relative to one another in a manner described below and they generate pressure waves in a manner similar to that of the sectors in FIG. 10 described earlier. The centroid is defined in the American Heritage Dictionary of the English Language, 1978, Houghton Mifflin Co., Boston, Mass. as the center of mass of an object having constant (i.e., uniform) density. If the object has varying density, the centroid of such object may be defined as the point which would be the centroid of such object if such object were of constant density.

The four members (first, second, third and fourth members) of any shape or size are so connected to a housing that in a quadrilateral, the four corners of which are defined by the centroids of the first, second and third members and the normal projection of the centroid of the fourth member on the plane defined by and containing the centroids of the first, second and third members, the four angles of the quadrilateral are each less than 180°. Preferably the centroids of the four members are coplanar and form the four corners of a square. Preferably, the plane containing the centroids is perpendicular to the borehole axis. If the four members are small so that they become essentially point pressure wave sources, then the four pressure waves are generated substantially at four points which are spatially located in the same manner as the centroids of the four members.

Referring back to the preferred embodiment shown in FIG. 10, substantially the same electrical pulse may be applied across the cylindrical surfaces of each of sectors 102, 104, 106, and 108 substantially simultaneously such that the pulses supplied to any two adjacent sectors are opposite in polarity. This arrangement is illustrated in FIG. 10. With such an arrangement, if one sector is caused by the electrical pulse to expand radially then the two adjacent sectors will contract radially and vice versa. If the four sectors are polarized radially outward then the directions of expansion and contraction will be as illustrated by hollow arrows in FIG. 10. During contraction of a sector its entire inner cylindrical surface will move inward; during its expansion its entire outer cylindrical surface will move outward. It should be appreciated that the polarization of the four sectors may be radially inward, opposite to that shown in FIG. 10. In such case, the directions of expansion and contraction caused by electric pulses of the polarity indicated in FIG. 10 will be opposite to those illustrated by the hollow arrows in FIG. 10. The substantially simultaneous expansion and contraction of the four sectors will generate a quadrupole P-wave in borehole liquid 24 of FIG. 2 which is then transmitted into earth formation 26 and detected by array 12 as described above. Operated in the manner described above in reference to FIG. 10, source 10 may be said to be in the quadrupole mode.

The four piezoelectric members 102, 104, 106, 108 of source 10 of FIGS. 3 and 10 may be connected to the logging sonde 20 in a manner most easily understood by reference to FIG. 3. Pistons 83 and 84 are of such diameters that they fit snugly into logging sonde 20. Pistons 83 and 84 have threaded recesses, 85 and 86 respectively, and the two pistons may be connected by a piston rod 114, the two ends of which are threaded and are of such sizes that they may be screwed into recesses 85 and 86 of pistons 83 and 84. To assemble source 10, piston rod 114 is inserted into an annular body of backing material 112 and the four members 102, 104, 106, 108 are placed on the outer cylindrical surface of body 112 so that they are substantially coaxial with the piston rod 114. Body 112 preferably is made of a backing material with good damping qualities to damp out the reverberations of the four members so that the four pressure wave trains generated by the four members are short in duration. Two annular rings of packing material 80 and 82 fit snugly over the four members and body 112 to keep the members in place. Piston rod 114 and pistons 83 and 84 are then assembled as described earlier and the entire assembly is inserted into the logging sonde 20. Logging sonde 20 has four windows distributed around its circumference near source 10, and enclosed sealingly by four rubber membranes 87, 88, 89 and 90. Although four windows are shown in FIG. 10, sonde 22 may have more or less than four windows.

The four rubber membranes sealingly close the four windows by being attached to the logging sonde by conventional means, such as mechanical clips. The spaces between the four rubber membranes and the four piezoelectric members are filled by oil 116. O-rings 94 and 96 seal the contacting surfaces between pistons 83, 84 and logging sonde 20 to prevent leakage of oil 116. The sectorial spaces between the oil-filled spaces are filled by backing material 118 for damping out the reverberations of the vibrations of the four sectors.

To provide for passageway for electrical connections, piston 83 and piston rod 114 have holes 120, 121 through their centers respectively. The two holes communicate with each other. Piston rod 114 further has a passageway 122 which is perpendicular to its axis and which communicates with hole 121. Piston 83 further has four passages 123 each in communication at one end with the hole 120 and the other end of each leading to the outer cylindrical surface of one of the four members. Firing and recording control unit 62, comprising an electric pulse generator, is connected to the four members by two groups of wires: Group 124 comprising four wires 124a, 124b, 124c, and 124d; and Group 125 comprising wires 125a, 125b, 125c, and 125d. The Group 124 wires and the Group 125 wires are connected to the generator through a switch so that the pulses supplied to the outside surfaces of adjacent members may have the same or opposite polarities. Wires 124c and 124d are threaded through hole 120 and then through the passages 123 and are connected to the outer cylindrical surfaces of the members 104 and 108. Wires 124a and 124b are threaded through the hole 120 of piston 83 and hole 121 of piston rod 114 and are then connected through hole 122 and body 112 to the inner cylindrical surfaces of members 102 and 106 respectively. In a similar manner, wires 125a and 125b are threaded through hole 120, passages 123 and are connected to the outer cylindrical surfaces of members 102 and 106 respectively. Similarly, wires 125c and 125d are threaded through holes 120, 121 and 122 and are connected to the inner cylindrical surfaces of members 104 and 108 respectively. Thus, when the electrical pulse generator applies an electrical pulse across the two groups of wires, the pulse is applied across each pair of wires connected to one of the four members. If the Group 124 wires are connected to the positive terminal of the generator and the Group 125 wires to the negative terminal, the pulse causes the inner cylindrical surfaces of members 102 and 106 to be at a higher electrical potential than their outer cylindrical surfaces. If members 102 and 106 are polarized radially outward, it is well known that such electrical potentials will cause members 102 and 106 to contract radially initially. The pulses applied by the generator will cause the outer cylindrical surfaces of members 104 and 108 to be at a higher electrical potential than their inner cylindrical surfaces. Members 104 and 108 are polarized radially outward and such electrical potential will cause the two members to expand radially initially.

Connected in the above manner, therefore, substantially the same electrical pulse is applied by the generator substantially simultaneously to the four members, causing them to move substantially simultaneously: members 102 and 106 to contract and move inward initially and members 104 and 108 to expand and move outward initially. It is well known that after a piezoelectric material is caused to expand or contract initially by an electrical pulse, it will alternately expand and contract even though no electrical pulses are supplied after the initial triggering pulse. Thus, after the electrical pulses are applied to the four members which cause members 102 and 106 to contract and members 104 and 108 to expand, members 102 and 106 will then alternately expand and contract, and members 104 and 108 will alternately contract and expand. In their alternate expansions and contractions, the four members lose energy and their vibrations are eventually dampened out, but in the duration of their expansion and contraction, the four members generate four pressure wave trains. Since the four electrical pulses applied by the generator to the four members are substantially the same except for polarity, the four pressure wave trains have substantially the same wave form. The wave trains generated by members 102 and 106 are substantially in phase. The wave trains generated by members 104 and 108 are substantially in phase with each other but are substantially opposite in phase to the wave trains generated by members 102 and 106. Such pressure waves are transmitted through oil 116, the rubber membranes, then into the borehole fluid 24 and eventually into earth formation 26. The four pressure waves so generated will interfere and produce a quadrupole compressional wave in the earth formation 26. Such compressional wave propagates through the earth formation, is refracted back into the borehole fluid 24 and is detected at a distance from the logging source 10 as will be explained below.

The four piezoelectric members 102, 104, 106, and 108 may be readily made from piezoelectric crystals available commercially. Piezoelectric crystals supplied by the Vernitron Company of Bedford, Ohio have been satisfactory. One type of commercially available piezoelectric crystal is in the form of a hollow cylinder polarized radially outward. The inner and outer cylindrical surfaces of such crystals are each coated with a layer of conducting material, such as silver. Since the electrical pulse from the generator may be applied to adjacent members of the four members in opposite polarity, the inner cylindrical surfaces of adjacent members as well as their outer cylindrical surfaces must be electrically insulated. Such insulation may be achieved by cutting out four narrow longitudinal sections to yield the four sectors 102, 104, 106, and 108. Alternatively, instead of cutting out such narrow longitudinal sections, the conducting layer on both the inner and outer surfaces of such sections may be scraped off.

Figure 4:
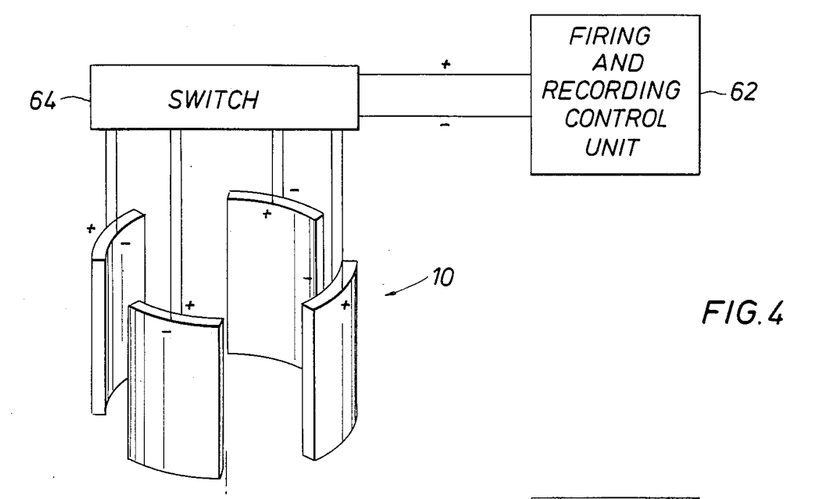
FIG. 4 is a simplified, partially perspective and partially schematic view of the quadrupole compressional wave logging device of FIG. 2, illustrating the orientation of the detectors relative to that of the quadrupole source and the electrical connections to the source and detectors.

FIG. 4 is a simplified perspective view of the quadrupole P-wave logging device of FIG. 2, illustrating how the device may be used to log the P-wave velocity of the virgin formation. To detect the quadrupole P-wave generated by source 10, each detector of array 12 is preferably also a quadrupole detector of similar construction as source 10. For simplicity only detector D1 of array 12 is shown in FIG. 4. The four sectors of detector D1 are placed so that they have substantially the same axis as the four sectors of source 10 and that they have substantially the same lateral positions around the common axis as the sectors of source 10.

As shown in FIG. 4 the firing and recording control unit 62 supplies an electrical pulse across each of the four sectors through switch 64 such that the pulses supplied to any two adjacent sectors are opposite in polarity. By pulling switch 64, the polarities of the pulses supplied to the sectors may be changed so that the pulses supplied to all four sectors have the same polarity. That is, the outer cylindrical surfaces of the four sectors will have substantially the same electrical potential. Such potential will be different from the electrical potentials of the inner cylindrical surfaces of the four sectors. The inner cylindrical surfaces of the four sectors will also have substantially the same electrical potential. Where the pulses supplied to all four sectors have the same polarity, the four sectors are in the monopole mode. In this mode, all four sectors will radially expand and contract in substantially the same phase, and source 10 becomes a monopole source.

Each detector of array 12 may be connected to band pass filter 70 through switch 68 in substantially the same manner as the connection between firing and recording control unit 62 and source 10 such that if source 10 is operated in the quadrupole mode then each detector is also operated in a quadrupole mode, and if source 10 is operated in the monopole mode then each detector will also be operated in the monopole mode. With the arrangement illustrated in FIG. 4 the acoustic logging device of FIG. 2 may be used to log both the monopole P-wave arrival and the quadrupole P-wave arrival. As explained above, Pi, the P-wave traveling in the invaded zone may be comparable in amplitude to Pv, the P-wave traveling in the virgin formation. The monopole compressional wave log will indicate the arrival caused by compressional wave transmission through the invaded zone. This information may be helpful to identify noise in the quadrupole compressional wave log of Pv caused by Pi.

Figure 5:
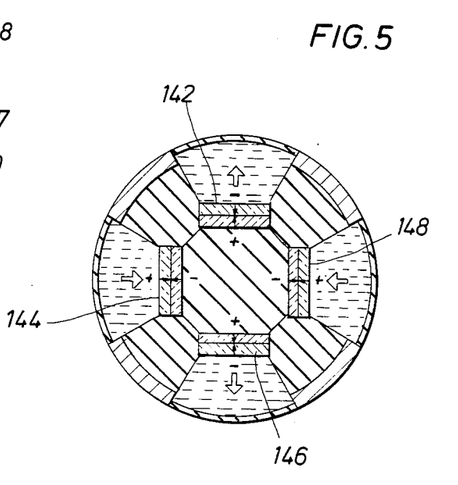
FIG. 5 is a cross-sectional view of a quadrupole compressional wave logging source illustrating an alternate embodiment of this invention.

FIG. 5 is a cross-sectional view of another quadrupole P-wave logging source which may be used to log the P-wave velocities of formations away from the borehole. The source of FIG. 5 is similar in construction to the source of FIGS. 3 and 10 except that instead of four cylindrical sectors the source of FIG. 5 comprises four elongated piezoelectric composite plates 142, 144, 146 and 148 so spatially oriented within the logging sonde that the four plates form substantially the four rectangular sides of an elongated cube. Each of the four composite plates comprises two oppositely polarized piezoelectric plates bonded together. The four composite plates are attached to the logging sonde by two clamping plates (not shown in FIG. 5). Each of the two clamping plates has four slots into which the ends of the four composite plates are fitted snugly. The two clamping plates are then inserted into and attached to the sonde in such position that the elongated composite plates are substantially parallel to the logging sonde axis. The portion of each composite plate between the two ends will hereinbelow be called the "unclamped portion."

Substantially the same electrical pulse may be applied across the flat surfaces of each of the four composite plates substantially simultaneously. The pulses applied to any two adjacent composite plates may be opposite in polarity such that if the unclamped portion of one composite plate bends and move radially outward then the unclamped portions of the two adjacent composite plates will bend and move radially inward. The directions of the bending movements of the four composite plates are illustrated by hollow arrows in FIG. 5. The bending motions of the four composite plates will generate a quadrupole P-wave in the borehole liquid which is transmitted through the earth formation and detected as described above. To detect the quadrupole P-wave arrival in the borehole liquid the detectors in ray 12 are preferably the quadrupole type which may be of similar construction to the quadrupole sources illustrated in FIG. 3 or in FIG. 5. The quadrupole sources and detectors of the type illustrated in FIG. 5 may be operated as monopole sources and detectors in substantially the same manner as that described in FIG. 4.

The composite plates illustrated in FIG. 5 are available commercially. Composite plates supplied by the Vernitron Company of Bedford, Ohio have been found satisfactory.

Figure 6:
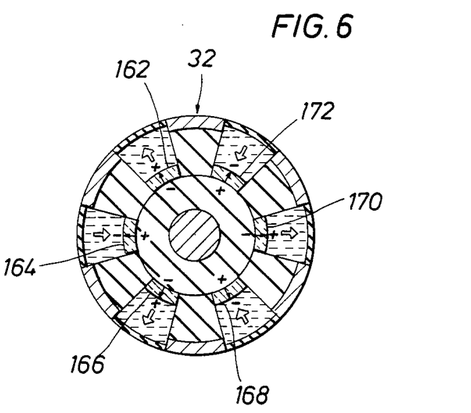
FIG. 6 is a cross-sectional view of an octopole compressional wave logging source illustrating still another embodiment of this invention.

FIG. 6 is a cross-sectional view of an octopole P-wave source which may be used to log the compressional wave velocity of the virgin formation. Six substantially similar sectors 162, 164, 166, 168, 170, 172 of a radially polarized piezoelectric hollow cylinder are so spatially arranged that they are substantially coaxial with and equidistant from the sonde axis. Substantially the same electrical pulse is applied across the cylindrical surfaces of each sector substantially simultaneously such that the pulses applied to any two adjacent sectors are opposite in polarity. This arrangement is illustrated in FIG. 6. With such an arrangement, adjacent sectors are caused to vibrate in opposite phases. If the six sectors are polarized radially outward then the directions of expansion and contraction of the six sectors as they begin to vibrate will be as illustrated by hollow arrows in FIG. 6. The vibrations of the six sectors will generate an octopole P-wave which is transmitted into the earth formation and detected as described above. To detect the octopole P-wave arrival the detectors of the ray 12 may be of similar construction to the octopole source illustrated in FIG. 6, or in FIG. 7, which will be described later. The octopole source illustrated in FIG. 6 may be attached to section 32 of sonde 22 in the same manner as the quadrupole source of FIG. 3. The section containing the octopole source of FIG. 6 may also be similar in construction to that of the section containing the quadrupole source of FIG. 3.

Figure 7:
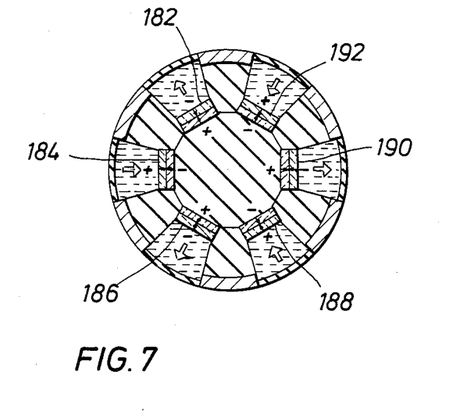
FIG. 7 is a cross-sectional view of an octopole compressional wave logging source illustrating still another embodiment of this invention.

FIG. 7 is a cross-sectional view of still another octopole source which may be used to log the P-wave velocity of a virgin formation. The octopole source of FIG. 7 is similar to the quadrupole source of FIG. 5 except that six elongated composite plates are employed instead of four. The six elongated piezoelectric composite plates 182, 184, 186, 188, 190, 192 are so spatially arranged that they form substantially the parallelograms of a hexagonal prism. The six composite plates are attached to the logging sonde by clamping plates in a manner similar to that for the quadrupole source of FIG. 5. The unclamped portion of the six composite plates are vibrated by electrical pulses in a manner similar to that for the quadrupole source of FIG. 5 so that the unclamped portions of the adjacent plates will vibrate in substantially opposite phases. The directions of the bending movements of the six plates as they begin to vibrate are illustrated by hollow arrows in FIG. 7. The vibrations of the six plates will generate an octopole P-wave which penetrates the invaded zone to reach the virgin formation for logging the virgin formation.

The higher order multipole sources and detectors may be constructed in a manner similar to embodiments of the octopole P-wave source illustrated in FIGS. 6 and 7. Thus, the 16-pole source may be constructed by spatially arranging eight substantially identical sectors of a radially polarized piezoelectric hollow cylinder around a common axis. Substantially the same electrical pulse is applied to each sector such that adjacent sectors vibrate in substantially opposite phases. An alternative embodiment of the 16-pole source is constructed if the eight sectors are replaced by eight elongated piezoelectric composite plates arranged to form the eight parallelograms of an octagonal prism. Substantially the same electrical pulse is applied to each of the eight composite plates with such polarity that adjacent plates vibrate in substantially opposite phases. Other ways of constructing and vibrating the plates and sectors may be used so long as the plates and sectors are vibrated in the same manner. Other higher order multipole sources and detectors may be constructed in a similar manner. Preferably the detectors used to detect a higher order compressional wave arrivals will be of an order that matches the order of the source.

Figure 8:
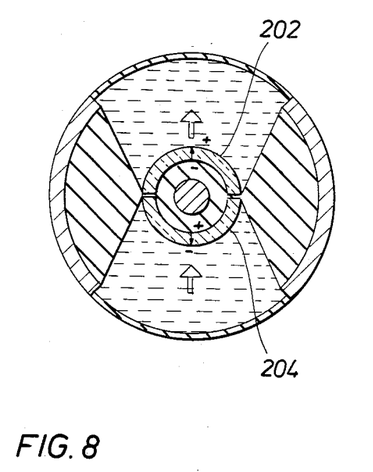
FIG. 8 is a cross-sectional view of a dipole compressional wave logging source illustrating a further alternate embodiment of this invention.

FIG. 8 is a cross-sectional view of a dipole P-wave source which may be used to log the compressional wave velocity of the virgin formation. Two substantially similar sectors 202 and 204 of a radially polarized piezoelectric hollow cylinder are so spatially arranged that they are substantially coaxial with and equidistant from the sonde axis. Substantially the same electrical pulse is applied across the cylindrical surfaces of each sector substantially simultaneously such that the pulses applied to the two sectors are opposite in polarity. This arrangement is illustrated in FIG. 8. With such an arrangement, the vibrations of the two sectors will generate a dipole P-wave which is transmitted to into the earth formation and detected as described above. The dipole source of FIG. 8 may be attached to section 32 in the same manner as the quadrupole source of FIG. 3. The section containing the dipole source of FIG. 8 may also be similar in construction to that of the section containing the quadrupole source of FIG. 3.

Figure 9:
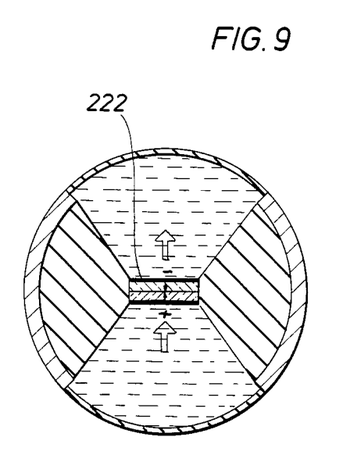
FIG. 9 is a cross-sectional view of a dipole compressional wave logging source illustrating yet another alternate embodiment of this invention.

FIG. 9 is a cross-sectional view of still another dipole source which may be used to log the P-wave velocity of a virgin formation. The dipole source of FIG. 9 is similar to the quadrupole source of FIG. 5 except that a single elongated piezoelectric composite plate 222 is employed rather than four. Piezoelectric plate 222 may be attached to the logging sonde by clamping plates in a manner similar to that for the quadrupole source of FIG. 5. The unclamped portion of plate 222 is vibrated by electrical pulses in a manner similar to that for the quadrupole source of FIG. 5 to generate a dipole P-wave which is transmitted into the earth formation and detected as described above. The dipole source of FIG. 9 may be attached to section 32 in the same manner as the quadrupole source of FIG. 3. The section containing the dipole source of FIG. 9 may also be similar in construction to that of the section containing the quadrupole source of FIG. 3.

The number of composite plates or sectors in the embodiments of the octopole and the 16-pole source described above does not match the nomenclature of the octopole and 16-pole sources. Thus, a dipole (n=1) source comprises two times one or two plates or sectors. A quadrupole (n=2) source comprises two times two or four plates or sectors. An octopole (n=3), a 16-pole (n=4) and a 32-pole (n=5) source comprises six, eight, and ten plates or sectors respectively. Therefore, in general a $2^n$-pole source will comprise 2n plates or sectors, n being an integer where n=1, 2, 3 and so on indefinitely.

The above description of method and construction used is merely illustrative thereof. Various changes in shapes, sizes, materials, or other details of the method and construction may be within the scope of the appended claims without departing from the spirit of the invention.

We claim:

1. An apparatus for logging the P-wave velocity of a virgin earth formation surrounding a borehole containing liquid, said apparatus comprising:

a housing adapted to be lowered into and raised from the borehole;

signal generating means within said housing for transmitting a $2^n$-pole P-wave, where n is an integer greater than zero, into the borehole liquid, when the signal generating means is in a position separated from the borehole wall and not in direct contact with the borehole wall, such that said $2^n$-pole P-wave will subsequently propagate into the virgin earth formation; and signal detecting means within said housing for detecting the arrival of the $2^n$-pole P-wave, after said $2^n$-pole P-wave has traveled in the virgin earth formation, at at least one location in the borehole spaced longitudinally along the borehole from the signal generating means.

2. The apparatus of claim 1, wherein the $2^n$-pole P-wave transmitted is a quadrupole P-wave.

3. The apparatus of claim 1, wherein the $2^n$-pole P-wave transmitted is an octopole P-wave.

4. The apparatus of claim 1, wherein the signal detecting means detects the $2^n$-pole P-wave arrival at two locations in the borehole spaced longitudinally along the borehole from each other, said apparatus further comprising means for measuring the time interval between the detections of the $2^n$-pole P-wave arrival at said two locations.

5. An apparatus for logging the P-wave velocity of a virgin earth formation surrounding a liquid-containing borehole, said apparatus comprising:

a logging sonde adapted to be lowered into and raised from the borehole;

a $2^n$-pole acoustic source connected to the sonde for transmitting a $2^n$-pole P-wave through the liquid into the virgin earth formation, where n is an integer greater than zero; and signal detecting means connected to the sonde including at least one detector for detecting the arrival of the $2^n$-pole P-wave spaced longitudinally along the borehole sufficiently far from the source so that any significant arrivals of waves generated by the source other than the $2^n$-pole P-wave arrival will be detected after the $2^n$-pole P-wave arrival and will be distinguishable from the $2^n$-pole P-wave arrival.

6. The apparatus of claim 5, further comprising band pass filtering means for suppressing all frequency components of any arrivals detected by the signal detecting means having frequencies outside a selected range, where the selected range includes frequencies at which the amplitude of the detected $2^n$-pole P-wave arrival is large relative to the amplitude of any other of the detected arrivals.

7. The apparatus of claim 5, further comprising means for increasing the distance between the $2^n$-pole acoustic source and said at least one detector.

8. The apparatus of claim 6, wherein the logging sonde comprises separable sections including a first section containing the $2^n$-pole acoustic source and a second section containing said at least one detector, and wherein the distance between the $2^n$-pole acoustic source and said at least one detector can be increased by adding spacer sections between said first section and said second section.

9. The apparatus of claim 5, wherein the $2^n$-pole acoustic source is a quadrupole source.

10. The apparatus of claim 5, wherein the $2^n$-pole acoustic source is an octopole source.

11. A method for logging the P-wave velocity of a virgin earth formation which surrounds a borehole but which is separated from the borehole by an invaded zone, said method comprising the steps of:
   (a) transmitting from a point in the borehole a $2^n$-pole P-wave into a formation zone surrounding the borehole, where n is an integer greater than zero;
   (b) measuring the P-wave velocity of the formation zone by detecting the arrival of the $2^n$-pole P-wave at a point in the borehole spaced longitudinally along the borehole from the point of transmission; and
   (c) repeating the steps (a) and (b) with successively increased spacings between said point of transmission and said point of detection until the P-wave velocities measured in two consecutive measurements are substantially the same, whereby said measured P-wave velocity is substantially the P-wave velocity of the virgin earth formation.

12. A method for logging the P-wave velocity of a virgin formation which surrounds a borehole but which is separated from the borehole by an invaded zone, said method comprising the steps of:
   (a) transmitting a $2^n$-pole P-wave from a point in the borehole into a formation zone surrounding the borehole, n being an integer greater than zero;
   (b) measuring the P-wave velocity of a region of the formation zone located a first distance from the borehole by detecting the arrival of the P-wave at two locations in the borehole spaced longitudinally along the borehole from the point of transmission and from each other and measuring the time interval between the detections of said $2^n$-pole P-wave arrival at said two locations; and
   (c) repeating the steps (a) and (b) with successively increased spacings between said point of transmission and said two locations of detection to measure the P-wave velocities of regions of the formation zone located at distances successively farther away from the borehole until the P-wave velocities measured in two consecutive measurements are substantially the same, whereby said measured P-wave velocity is substantially the P-wave velocity of the virgin earth formation.

13. A method for determining the radial thickness of an invaded zone of an earth formation surrounding a borehole where a virgin earth formation surrounds the borehole and is separated from the borehole by said invaded zone, said method comprising the steps of:
   (a) transmitting a $2^n$-pole P-wave from a point in the borehole into the earth formation surrounding the borehole, n being an integer greater than zero;
   (b) measuring the P-wave velocity of a zone of the earth formation located at a first radial distance from the borehole by detecting the arrival of the $2^n$-pole P-wave at a first location and at a second location in the borehole spaced longitudinally along the borehole from the point of transmission and from each other, where the second location is spaced farther from the point of transmission than is the first location, and measuring the time interval between the detections of said $2^n$-pole P-wave arrival at said first location and said second location; and
   (c) repeating the steps (a) and (b) with successively increased longitudinal spacings between said point of transmission and said first location and between said point of transmission and said second location to measure the P-wave velocities of zones of the earth formation located successively radially farther away from the borehole until the P-wave velocities measured in two consecutive measurements are substantially the same and are substantially equal to Cv, and determining the radial thickness t of the invaded zone of the earth formation from the known velocity Ci of P-waves in the invaded zone, by identifying Cv as the velocity of P-waves in the virgin formation, and determining t from the relationship:

$$t = (z/2)(((Cv/Ci) - 1)((Cv/Ci) + 1))^{\frac{1}{2}},$$

where z is the smallest spacing between said point of transmission and said first location at which said substantially constant P-wave velocity measurement is obtained.

14. A method for logging the S-wave velocity of a virgin earth formation which surrounds a borehole but which is separated from the borehole by an invaded zone, said method comprising the steps of:
   (a) transmitting from a point in the borehole a $2^n$-pole S-wave into a formation zone surrounding the borehole, where n is an integer greater than zero;
   (b) measuring the S-wave velocity of the formation zone by detecting the arrival of the $2^n$-pole S-wave at a point in the borehole spaced longitudinally along the borehole from the point of transmission; and
   (c) repeating the steps (a) and (b) with successively increased spacings between said point of transmission and said point of detection until the S-wave velocities measured in two consecutive measurements are substantially the same, whereby said measured S-wave velocity is substantially the S-wave velocity of the virgin earth formation.

15. A method for logging the S-wave velocity of a virgin formation which surrounds a borehole but which is separated from the borehole by an invaded zone, said method comprising the steps of:
   (a) transmitting a $2^n$-pole S-wave from a point in the borehole into a formation zone surrounding the borehole, n being an integer greater than zero;
   (b) measuring the S-wave velocity of a region of the formation zone located a first distance from the borehole by detecting the arrival of the S-wave at two locations in the borehole spaced longitudinally along the borehole from the point of transmission and from each other and measuring the time interval between the detections of said $2^n$-pole S-wave arrival at said two locations; and
   (c) repeating the steps (a) and (b) with successively increased spacings between said point of transmission and said two locations of detection to measure the S-wave velocities of regions of the formation zone located at distances successively farther away from the borehole until the S-wave velocities measured in two consecutive measurements are substantially the same, whereby said measured S-wave velocity is substantially the S-wave velocity of the virgin earth formation.

16. A method for determining the radial thickness of an invaded zone of an earth formation surrounding a borehole where a virgin earth formation surrounds the borehole and is separated from the borehole by said invaded zone, said method comprising the steps of:

(a) transmitting a $2^n$-pole S-wave from a from a point in the borehole into the earth formation surrounding the borehole, n being an integer grater than zero;

(b) measuring the S-wave velocity of a zone of the earth formation located at a first radial distance from the borehole by detecting the arrival of the $2^n$-pole S-wave a a first location and at a second location in the borehole spaced longitudinally along the borehole from the point of transmission and from each other, where the second location is spaced farther from the point of transmission than is the first location, and measuring the time interval between the detections of said $2^n$-pole S-wave arrival at said first location and said second location; and (c) repeating the steps (a) and (b) with successively increased longitudinal spacings between said point of transmission and said first location and between said point of transmission and said second location to measure the S-wave velocities of zones of the earth formation located successively radially farther away from the borehole until the S-wave velocities measured in two consecutive measurements are substantially the same and are substantially equal to Cv, and determining the radial thickness t of the invaded zone of the earth formation from the known velocity Ci of S-waves in the invaded zone, by identifying Cv as the velocity of S-waves in the virgin formation, and determining t from the relationship:

$$t = (z/2)(((Cv/Ci) - 1)((Cv/Ci) + 1))^{\frac{1}{2}},$$

where z is the smallest spacing between said point of transmission and said first location at which said substantially constant S-wave velocity measurement is obtained.

17. The apparatus of claim 1, wherein the $2^n$-pole P-wave has a frequency component equal to (a)(10/d)kHz, where the estimated velocity of P-waves in the formation zone into which the $2^n$-pole P-wave is transmitted is (a) thousand feet per second, and d is the borehole diameter in inches.

18. The apparatus of claim 5, wherein the $2^n$-pole P-wave has a frequency component equal to (a)(10/d)kHz, where the estimated velocity of P-waves in the formation zone into which the $2^n$-pole P-wave is transmitted is (a) thousand feet per second, and d is the borehole diamter in inches.

19. The method of claim 11, wherein the $2^n$-pole P-wave has a frequency component equal to (a)(10/d)kHz, where the estimated velocity of P-waves in the formation zone into which the $2^n$-pole P-wave is transmitted is (a) thousand feet per second, and d is the borehole diameter in inches.

20. The method of claim 12, wherein the $2^n$-pole P-wave has a frequency component equal to (a)(10/d)kHz, where the estimated velocity of P-waves in the formation zone into which the $2^n$-pole P-wave is transmitted is (a) thousand feet per second, and d is the borehole diameter in inches.

21. The method of claim 13, wherein the $2^n$-pole P-wave has a frequency component equal to (a)(10/d)kHz, where the estimated velocity of P-waves in the formation zone into which the $2^n$-pole P-wave is transmitted is (a) thousand feet per second, and d is the borehole diameter in inches.

* * * * *